(12) United States Patent
Tani et al.

(10) Patent No.: US 8,603,928 B2
(45) Date of Patent: Dec. 10, 2013

(54) INFRARED TRANSMITTING GLASS FOR MOLD FORMING

(75) Inventors: Kunihiko Tani, Osaka (JP); Tatsuya Suetsugu, Osaka (JP); Naoko Kaga, Osaka (JP); Maki Tanigawa, Osaka (JP); Takeshi Morihara, Osaka (JP); Yoshinobu Matsumura, Osaka (JP); Kiyoshi Shinohara, Osaka (JP); Toshihiko Einishi, Osaka (JP); Kohei Kadono, Kyoto (JP)

(73) Assignee: Isuzu Glass Co., Ltd., Osaka-shi (JP)

( * ) Notice: Subject to any disclaimer, the term of this patent is extended or adjusted under 35 U.S.C. 154(b) by 215 days.

(21) Appl. No.: 12/744,171

(22) PCT Filed: Dec. 26, 2008

(86) PCT No.: PCT/JP2008/073695
§ 371 (c)(1),
(2), (4) Date: May 21, 2010

(87) PCT Pub. No.: WO2009/084619
PCT Pub. Date: Jul. 9, 2009

(65) Prior Publication Data
US 2010/0285946 A1    Nov. 11, 2010

(30) Foreign Application Priority Data

Dec. 28, 2007 (JP) .................. 2007-340306

(51) Int. Cl.
*C03C 3/32* (2006.01)
(52) U.S. Cl.
USPC .......................................................... 501/40
(58) Field of Classification Search
USPC .......................................................... 501/40
See application file for complete search history.

(56) References Cited

U.S. PATENT DOCUMENTS

| | | | | |
|---|---|---|---|---|
| 4,708,942 A * | 11/1987 | Nishiii et al. | .................... | 501/40 |
| 5,346,523 A | 9/1994 | Sugai | | |
| 5,389,584 A * | 2/1995 | Aitken et al. | .................... | 501/40 |
| 5,392,376 A * | 2/1995 | Aitken et al. | .................. | 385/144 |
| 5,629,248 A * | 5/1997 | Aggarwal et al. | ................ | 501/40 |
| 6,277,775 B1 * | 8/2001 | Aitken | ............................ | 501/40 |
| 7,116,888 B1 | 10/2006 | Aitken | | |
| 7,330,634 B2 | 2/2008 | Aitken | | |
| 7,767,604 B2 * | 8/2010 | Aitken | ............................ | 501/40 |
| 2004/0079114 A1 * | 4/2004 | Aitken et al. | ...................... | 65/64 |
| 2006/0223688 A1 * | 10/2006 | Zhang et al. | ...................... | 501/40 |
| 2006/0233512 A1 | 10/2006 | Aitken | | |
| 2006/0257097 A1 * | 11/2006 | Aitken et al. | .................. | 385/147 |

FOREIGN PATENT DOCUMENTS

| | | |
|---|---|---|
| JP | 5-4824 | 1/1993 |
| JP | 5-85769 | 4/1993 |
| JP | 5-330832 | 12/1993 |
| JP | 6-92654 | 4/1994 |
| JP | 2000-512611 | 9/2000 |
| JP | 2006-76845 A1 | 3/2006 |
| JP | 2006-290738 A1 | 10/2006 |

OTHER PUBLICATIONS

International Search Report for International Application No. PCT/JP2008/073695 dated Feb. 19, 2009.
Popescu, Mihai A., "Non-Crystalline Chalcogenides," Kluwar Academic Publishers (2002), cover pages and pp. 153 and 194.
Rajesh, R., et al., "Thermal properties across threshold compositions in Ge-As-Se glasses," Journal of Materials Science, vol. 38 (2003), pp. 1513-1515.

* cited by examiner

*Primary Examiner* — Karl Group
*Assistant Examiner* — Elizabeth A Bolden
(74) *Attorney, Agent, or Firm* — Kratz, Quintos & Hanson, LLP

(57) ABSTRACT

The purpose of the present invention is to use chalcogenide glass to produce an infrared transmitting glass that is more suitable for mold-forming than the conventional glasses. Specifically, the invention provides an infrared transmitting glass for mold forming which contains, in molar concentrations, 2-22% of Ge, 6-34% of at least one element selected from the group consisting of Sb and Bi, 1-20% of at least one element selected from the group consisting of Sn and Zn and 58-70% of at least one element chosen from the group comprising S, Se and Te.

5 Claims, 2 Drawing Sheets

INFRARED TRANSMITTING GLASS FOR MOLD FORMING

TECHNICAL FIELD

The present invention relates to an infrared transmitting glass for mold forming.

BACKGROUND OF THE INVENTION

Infrared rays are used in most sensors for security or authentication systems, and the optical elements of these sensors are composed of infrared transmitting materials. In recent years, as social awareness grows about security and safety, high performance, small size and versatility are becoming key factors in the design of security and authentication systems. Therefore, increasing attention is being paid to high-performance, small-sized optical elements for compact sensors of the systems and their highly productive manufacturing processes.

Well-known examples of infrared transmitting materials are germanium and zinc selenide. However, these materials, being crystals, can be processed only by grinding forming. Therefore, it is difficult to use these materials to mass-produce complicatedly shaped optical elements such as lens arrays. Particularly, germanium is too expensive to be used for the production of versatile sensors.

One example of a non-crystal infrared transmitting material is chalcogenide glass composed mainly of S, Se and Te. For instance, Patent Documents 1-5 below relate to chalcogenide glass.

Patent Document 1 discloses a method for forming plastics using chalcogenide glass and describes the ways in which to prepare optical elements and the composition of chalcogenide glass suitable for the preparation.

Patent Documents 2 and 3 disclose the composition of chalcogenide glass, but neither of the documents shows the glass composition suitable for mold forming.

Patent Documents 4 and 5 describe methods for mold-forming chalcogenide glass, but neither of them indicates the detailed glass composition. These methods are using kinds of glasses that are difficult to mold-form, and it is necessary to modify the inventions to improve formability.

Patent Document 1: Patent Application Laid-Open No. 2006-290738
Patent Document 2: Patent Application Laid-Open No. 2006-76845
Patent Document 3: Patent Application Laid-Open No. Hei 5-85769
Patent Document 4: Patent Application Laid-Open No. Hei 6-92654
Patent Document 5: Patent Application Laid-Open No. Hei 5-4824

DISCLOSURE OF THE INVENTION

Problems to be Solved by the Invention

The purpose of the present invention is to use chalcogenide glass to produce an infrared transmitting glass that is more suitable for mold-forming than the conventional glasses.

Means for Solving the Problems

The present inventors have completed this invention by confirming through vigorous research that the above-mentioned purpose can be achieved by chalcogenide glass with a specific composition.

That is, this invention relates to:

1. An infrared transmitting glass for mold forming which contains, in molar concentrations, 2-22% of Ge, 6-34% of at least one element selected from the group consisting of Sb and Bi, 1-20% of at least one element selected from the group consisting of Sn and Zn and 58-70% of at least one element chosen from the group comprising S, Se and Te.
2. An infrared transmitting glass for mold forming as described in 1 above, whose deformation point is 240-400° C.
3. An infrared transmitting glass for mold forming as described in 1 above, whose expansion coefficient is $100 \times 10^{-7} - 200 \times 10^{-7}$.
4. An infrared transmitting glass for mold forming as described in 1 above, to be used for the production of spherical lenses, aspheric lenses, lens arrays, micro lens arrays or diffraction gratings Now, this invention will be described more specifically below.

This invention uses chalcogenide glass to produce an infrared transmitting glass for mold forming which contains, in molar concentrations, 2-22% of Ge, 6-34% of at least one element chosen from the group consisting of Sb and Bi, 1-20% of at least one element selected from the group comprising Sn and Zn and 58-70% of at least one element chosen from the group comprising S, Se and Te.

Compared to conventional chalcogenide glasses, an infrared transmitting glass for mold forming with the above-mentioned composition has high moldability. It is, therefore, possible to easily mold-form complicated shaped optical elements with infrared transmissibility using a glass of this invention.

Now, each component of an infrared transmitting glass for mold forming based on the present invention will be described below. Concerning a multi-component glass material, each component interacts with one another to determine the property of the material. It may not always be appropriate to specify the quantity of each component based on its characteristics, but the grounds on which the above preferable composition has been determined will be stated below.

An infrared transmitting glass of this prevention is composed of, in molar concentrations:
2-22% of Ge;
6-34% of at least one element selected from the group consisting of Sb and Bi;
1-20% of at least one element selected from the group comprising Sn and Zn; and
58-70% of at least one element chosen from the group comprising S, Se and Te.

Ge is useful for forming the structure of glass. The molar concentration must be 2-22%, but is preferably 3-22%. If the content is less than 2% or more than 22%, Ge may possibly crystallize.

At least one element chosen from the group consisting of Sb and Bi is also important for forming the structure of glass. The molar concentration (in total) must be 6-34%, but is desirably 8-34%. If the content is less than 6% or more than 34%, Sb or/and Bi may possibly crystallize.

At least one element selected from the group comprising Sn and Zn promotes glass formation. The molar content (in total) must be 1-20%, but is preferably 2-19%. If the content is less than 1% or more than 20%, Sn or/and Zn might crystallize.

At least one element chosen from the group comprising S, Se and Te forms the glass structure, too. The molar concentration (in total) must be 58-70%, but is preferably 59-65%. If the content is less than 58%, S, Se or/and Te might crystallize. The content exceeding 70% could reduce the efficiency of mold forming.

An infrared transmitting glass for mold forming based on the present invention can contain P, Ga, In or other elements. The content (total content) of these components are yet to be specified, but is preferably 0-7% and more preferably 1-5%. These elements can be added for promoting glass formation or any other unspecified purposes.

The infrared transmission of a glass of this invention can be determined according to the purposes of end products. For instance, the average transmission rate of the infrared rays whose wavelengths are in the range of 2-10 μm is 50-70%.

The deformation point of a glass of this invention is desirably 240-400° C., but more desirably 250-390° C. If the point is less than 240° C., the glass may possibly crystallize during mold forming. If the point is more than 400° C., the mold and the glass might react with each other.

The expansion coefficient of a glass of this invention is preferably $100 \times 10^{-7}$-$200 \times 10^{-7}$ and more preferably $105 \times 10^{-7}$-$170 \times 10^{-7}$. If the coefficient is less than $100 \times 10^{-7}$ or exceeds $200 \times 10^{-7}$, mold forming might be difficult.

Methods for producing a glass of this invention are yet to be specified, but for instance a method for encapsulating certain amounts of materials in quartz ampoules and vitrifying the materials through heat treating. For materials, single metals such as Ge, Sb, Bi, Sn, Zn, S, Se and Te and chalcogenides such as $GeS_2$, $GeSe_2$, $GeTe_2$, $Sb_2S_3$, $Sb_2Se_3$, $Sb_2Te_3$, $Bi_2S_3$, $Bi_2Se_3$, $BiTe_3$, SnS, SnSe, SnTe, ZnS, ZnSe and ZnTe can be used.

In the above-mentioned manufacturing method, the insides of the quartz ampoules should be dried sufficiently using vacuum dryer. The temperature of heat treatment for vitrification is desirably 500-1000° C. and more desirably 600-800° C. The time for heat treatment should be long enough for the materials in the ampoules to be sufficiently vitrified, and it is preferably 3-30 hours and more desirably 6-24 hours.

An infrared transmitting glass for mold forming based on the present invention has high moldability. During mold forming, the glass should be heated at a temperature close to its softening point and then molded into a desired shape by, for example, hot-pressing between upper and lower molds. The heating temperature for the forming is yet to be determined, but it is preferably 10-70° C. and more preferably 20-50° C. higher than the deformation point.

The kinds of optical elements to be mold-formed by this invention are not restricted, but it is recommendable to mold aspheric lenses, lens arrays, micro lens arrays, diffraction gratings or other optical elements that are required to transmit infrared rays for use in infrared sensors.

Advantages Of The Invention

An infrared transmitting glass for mold forming based on the present invention has high moldability compared to conventional chalcogenide glasses. It is, therefore, possible to easily mold-form complicated shaped optical elements with infrared transmissibility using a glass of this invention.

BEST MODE FOR CARRYING OUT THE INVENTION

Figure 1:
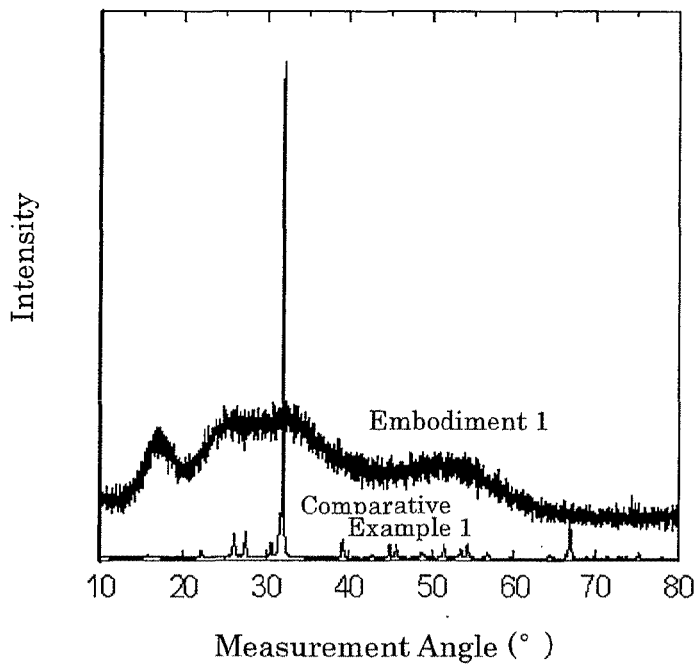
FIG. 1 shows X ray analysis patterns of the infrared transmitting glasses of Embodiment 1 and Comparative Example 1.
Figure 2:
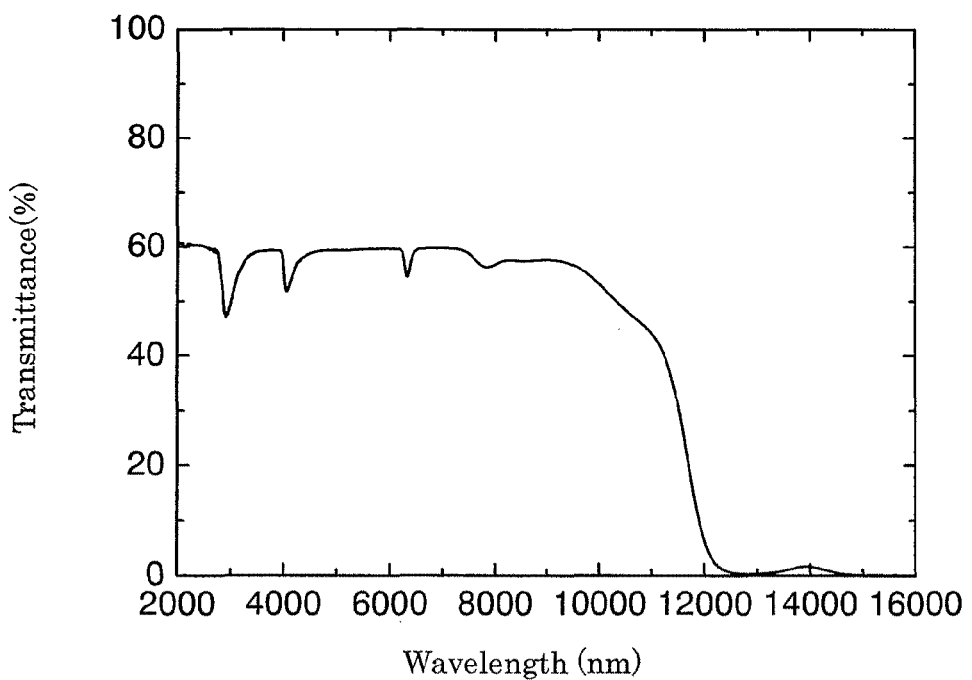
FIG. 2 shows a transmission rate curve of the infrared transmitting glass of Embodiment 1.
Figure 3:
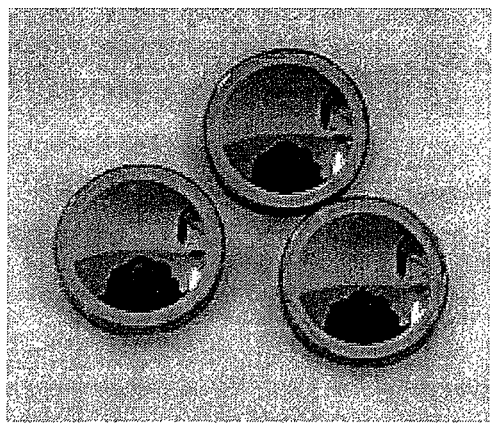
FIG. 3 is a photographed top view of aspheric lenses molded from the glass sample of Embodiment 1.

The present invention will be described in more detail by showing the embodiments and comparative examples below. However, this invention is not limited to the embodiments.

Embodiments 1-10 and Comparative Examples 1-3 Production of an Infrared Transmitting Glass for Mold Forming The interior of a quartz ampoule was washed clean using purified water, and then water remaining in the ampoule was vaporized under a vacuum using a rotary vacuum pump and a burner. A mixture of elements was prepared according to the composition shown in Table 1 and placed in the ampoule. The air was evacuated from the ampoule by the rotary vacuum pump, and the ampoule was sealed by an $H_2O_2$ burner.

The temperature of the sealed quartz ampoule was elevated to 750° C. at the heating speed of 20° C./h, and the ampoule was kept at the same temperature for 12 hours. After that, the ampoule was naturally cooled to room temperature and the mixture of elements inside was vitrified.

In order to confirm that the mixture had been vitrified, the XRD measurement of the mixture was carried out using an X ray analysis apparatus. As a result, it was confirmed that concerning Embodiments 1-10 the mixture had been vitrified, while regarding Comparative Examples 1-3 the mixture had not been vitrified due to crystallization. In table 1 below, ◯ means that the mixture was vitrified and X indicates that it was not.

TABLE 1

| | Composition (Unit: Molar %) | | | | Vitrification |
|---|---|---|---|---|---|
| | Ge | Sb | Sn | S | |
| Embodiment 1 | 5 | 30 | 5 | 60 | ◯ |
| Embodiment 2 | 3 | 32 | 5 | 60 | ◯ |
| Embodiment 3 | 3 | 31 | 6 | 60 | ◯ |
| Embodiment 4 | 12 | 24 | 3 | 61 | ◯ |
| Embodiment 5 | 11 | 16 | 14 | 59 | ◯ |
| Embodiment 6 | 21 | 11 | 5 | 63 | ◯ |
| Embodiment 7 | 18 | 11 | 9 | 62 | ◯ |
| Embodiment 8 | 22 | 8 | 7 | 63 | ◯ |
| Embodiment 9 | 7 | 22 | 13 | 58 | ◯ |
| Embodiment 10 | 8 | 20 | 13 | 59 | ◯ |
| Comparative Example 1 | 5 | 7 | 34 | 54 | X |
| Comparative Example 2 | 4 | 16 | 24 | 56 | X |
| Comparative Example 3 | 2 | 35 | 4 | 59 | X |

Next, the vitrified mixture in each of Embodiments 1-10 was heat-treated at 220° C. for 24 hours.

The heat-treated mixture (glass sample) was removed from the quartz ampoule and optically polished. The deformation point and expansion coefficient of the glass sample were measured using a thermal mechanical analyzer (TMA-60 manufactured by Shimadzu Corporation). As a result, the point and coefficient of the sample of Embodiment 1 were 256° C. and 165×10$^{-7}$ respectively.

(Production of Infrared Transmitting Lenses)

The glass sample of each of Embodiment 1-10 was mold-formed at 270° C. under a nitrogen atmosphere to produce aspheric lenses. As a result, it was confirmed that excellent aspheric lenses had been produced.

The invention claimed is:

1. An infrared transmitting glass for mold forming which consists of, in molar concentrations,
   2-22% of Ge,
   at least one element selected from the group consisting of Sb and Bi, wherein the sum of Sb and Bi is 6-34%,
   at least one element selected from the group consisting of Sn and Zn, wherein the sum of Sn and Zn is 1-20%,
   S, and optionally at least one element chosen from the group consisting of Se and Te, wherein the sum of S, Se and Te is 58-70%;
   wherein
   the deformation point of the infrared transmitting glass is 240-400° C.; and
   the linear thermal expansion coefficient of the infrared transmitting glass is 100×10$^{-7}$ to 200×10$^{-7}$ K$^{-1}$.

2. An optical element comprising the infrared transmitting glass for mold forming as described in claim 1, the optical element being a spherical lens, aspheric lens, lens array, micro lens array or diffraction grating.

3. An infrared transmitting glass for mold forming as described in claim 1, wherein the glass comprises Sn.

4. An infrared transmitting glass for mold forming as described in claim 1, wherein the glass comprises Zn.

5. An infrared transmitting glass for mold forming as described in claim 1, wherein the glass comprises 6 to 34 molar % of Bi.

* * * * *